May 22, 1951  G. W. TABOR  2,554,224
HAND BRAKE OPERATING MECHANISM
Filed April 2, 1947  4 Sheets-Sheet 1
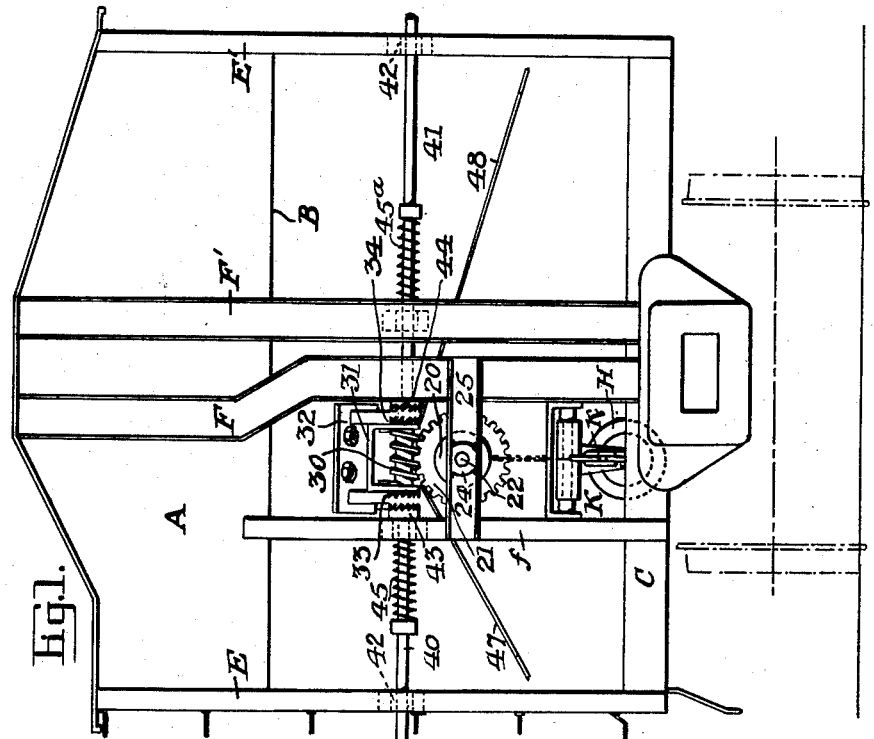
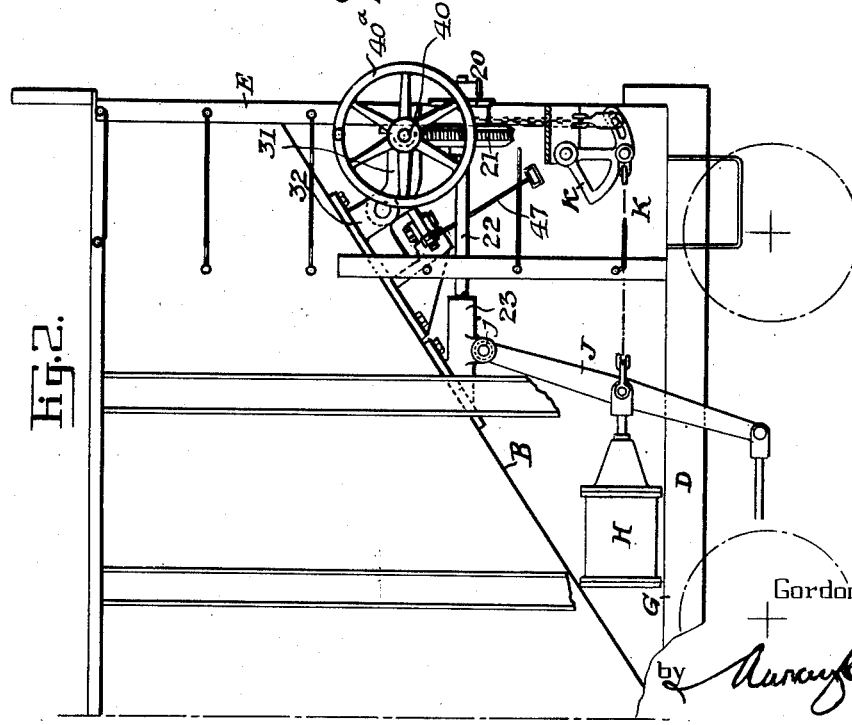
Gordon W. Tabor,
Inventor May 22, 1951 G. W. TABOR 2,554,224
HAND BRAKE OPERATING MECHANISM
Filed April 2, 1947 4 Sheets-Sheet 2
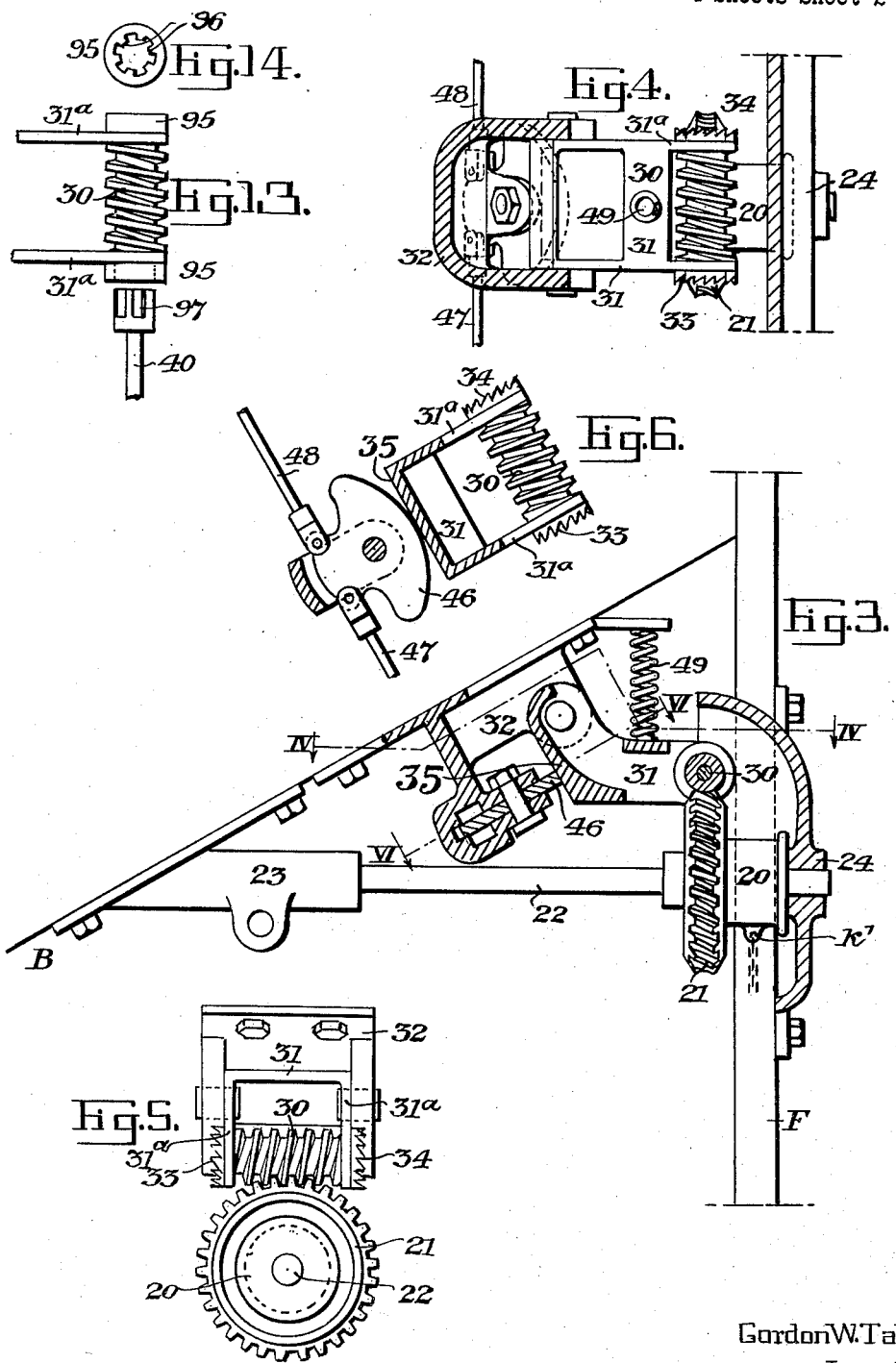
Gordon W. Tabor
Inventor
by Murray G. Boyer
Atty.

May 22, 1951 G. W. TABOR 2,554,224
HAND BRAKE OPERATING MECHANISM
Filed April 2, 1947 4 Sheets-Sheet 3
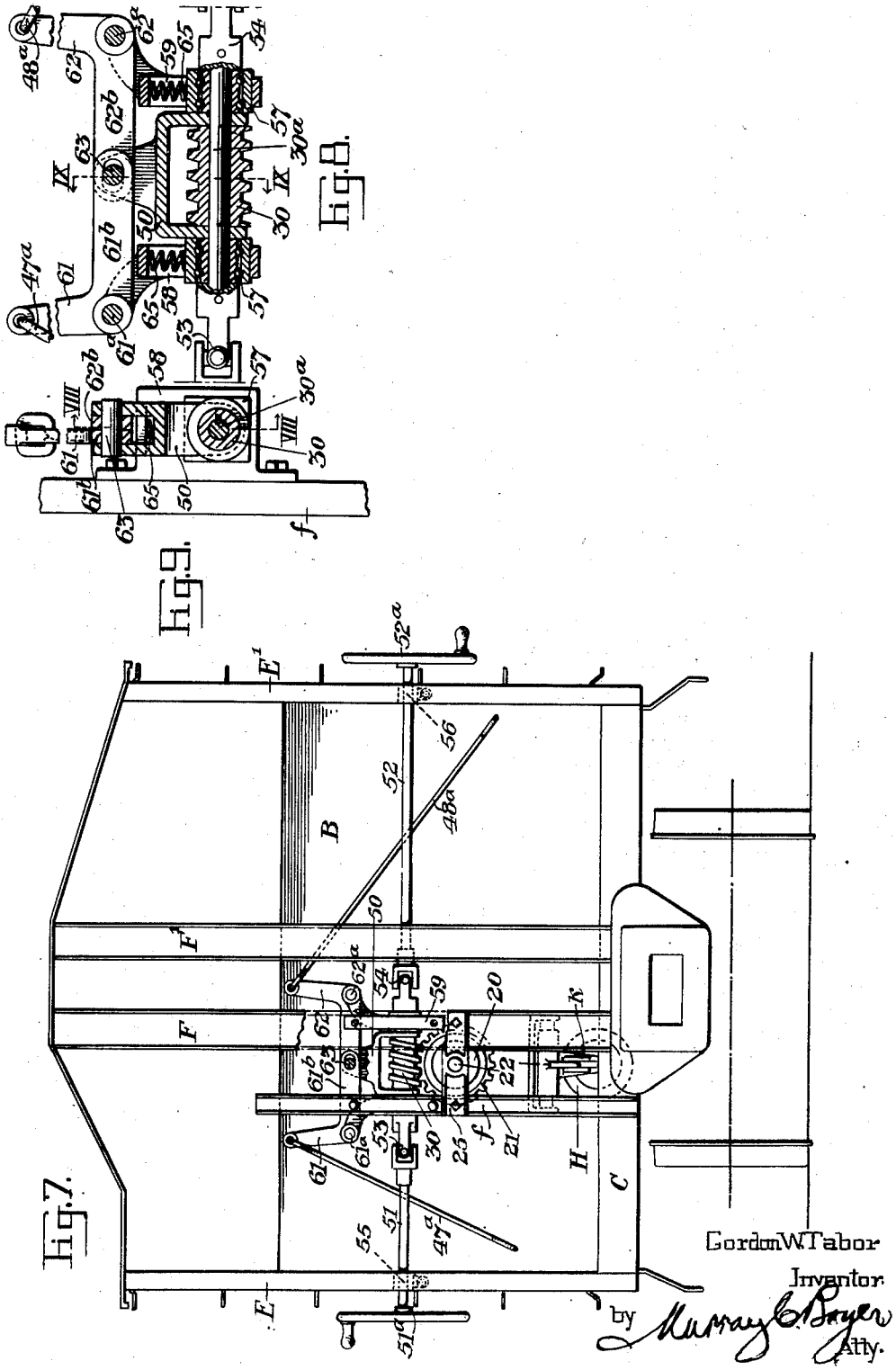
Gordon W Tabor
Inventor

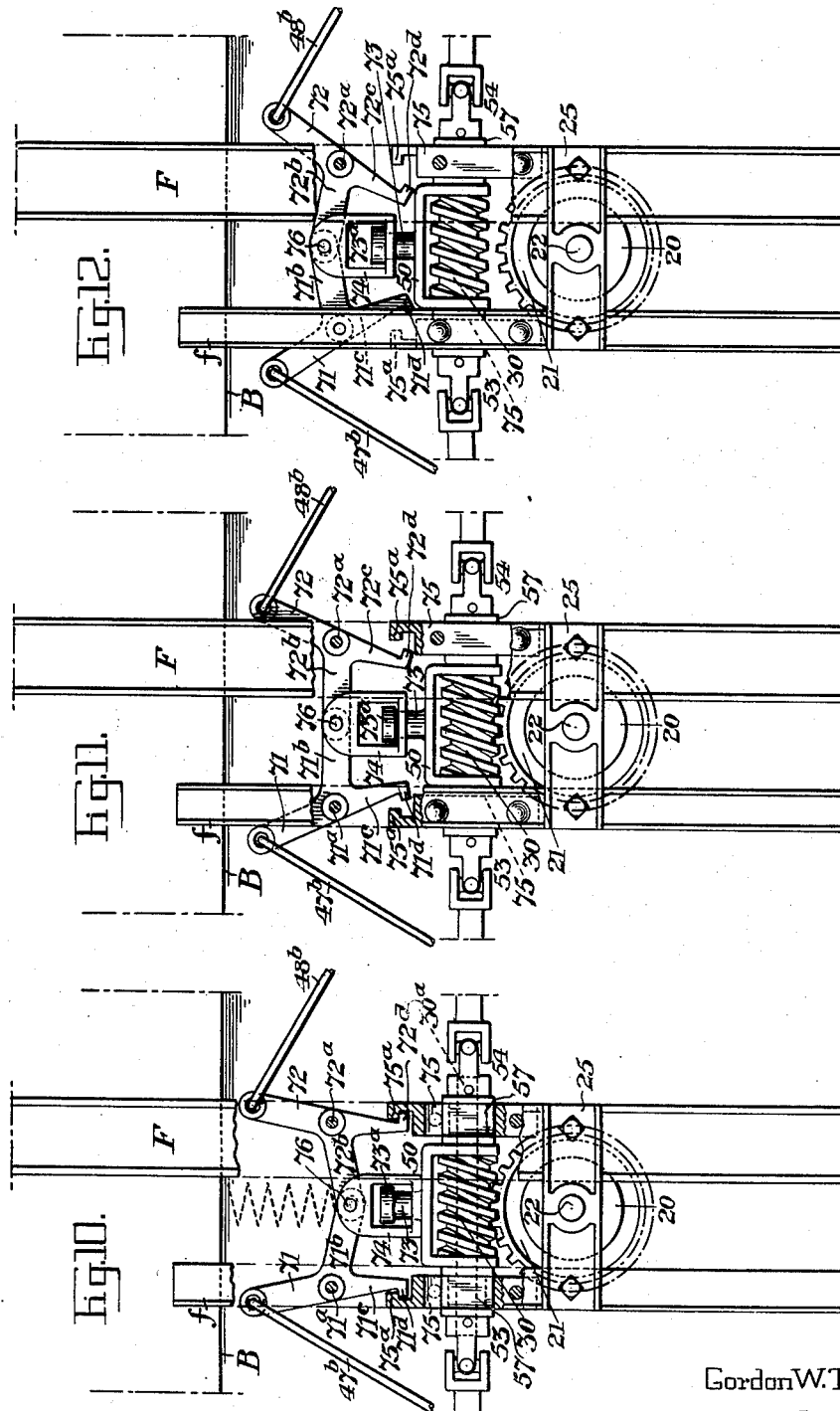

Patented May 22, 1951

2,554,224

UNITED STATES PATENT OFFICE 2,554,224

HAND-BRAKE OPERATING MECHANISM

Gordon W. Tabor, Beaver Pond District, W. Va.; Sadie G. Tabor administratrix of said Gordon W. Tabor, deceased Application April 2, 1947, Serial No. 738,950

13 Claims. (Cl. 74—507)

My invention relates to manually operated braking mechanism and the manner of mounting the same; more particularly the manner of mounting such mechanism for the operation of hand braking mechanism for coal cars of the "hopper type." Although designed more especially for use with hopper cars it will be understood that my improved mechanism, with but slight change or modification in the application of the supporting means and its arrangement, may be employed with all types of freight cars.

A special feature of my invention is the provision of mechanism that may be operated from the sides of the car—either side—whether the car is moving or standing still whereby, in the event of the operator accidentally slipping on a moving car, he will be thrown clear of the car and to one side of the track instead of dropping between the ends of adjacent cars and directly in line with the trucks and wheels of the same.

The main object of my invention is to provide simple and efficient means for applying the brakes and releasing the same within the requirements of the safety appliance rules.

A further object of my invention is to provide mechanism which includes types of self-locking gearing; avoiding the use of ratchet wheels and locking pawls which must be released before the braking action can be relieved.

A further object of my invention is to provide a winding drum for the flexible connection of the brake lever with a gear wheel operable by a worm which may be turned in either direction to effect winding of such connection upon the drum in the application of the brakes.

A further object of my invention is to provide displaceable mechanism for actuating said worm.

A further object of my invention is to provide simple and efficient means whereby the worm and gear wheel may be separated when the braking action is to be relieved.

A further object of my invention is to provide means whereby the winding drum may be displaced with respect to the operating gearing.

A further object of my invention is to provide means whereby the operating gearing may be displaced with respect to the winding drum.

A further object of my invention is to provide simple and efficient means whereby the worm of the operating gearing may be displaced with respect to the worm wheel.

A further object of my invention is to provide simple and efficient means whereby the worm wheel of the operating gearing may be displaced with respect to the worm.

A further object of my invention is to provide simple and efficient means whereby the braking mechanism may be operated from both sides of the car; either to apply the same or to effect separation of the coöperative parts of the operating gearing whereby the braking action may be relieved.

And a still further object of my invention is to provide locking or latching means whereby the parts of the operating gearing may be held in operative engagement preparatory to applying the braking means.

These and other features of my invention are more fully set forth hereinafter; reference being had to the accompanying drawings, more or less diagrammatic in character, in which:

Figure 1 is an end elevational view of one form of car to which my improved manually operated braking mechanism may be applied; a coal car of the hopper type.

Fig. 2 is a side elevational view of a portion of the end of a car such as illustrated in Fig. 1; showing the position of my improved mechanism lengthwise of the car.

Fig. 3 is an enlarged view, partly in section on the line III—III, Fig. 1, of one form of means within the scope of my invention for separating the gearing elements.

Fig. 4 is a plan view, partly in section on the line IV—IV, Fig. 3, illustrating means for shifting the bracket carrying the worm whereby the gearing may be separated to relieve the braking action.

Fig. 5 is a fragmentary end view of the gear mechanism illustrated in Fig. 3, omitting the shield or guard.

Fig. 6 is a sectional view on the line VI—VI, Fig. 3.

Fig. 7 is a view similar to Fig. 1, illustrating modified means for separating the worm from its engagement with the worm wheel.

Fig. 8 is an enlarged sectional view on the line VIII—VIII, Fig. 9, of a portion of the mechanism shown in Fig. 7.

Fig. 9 is a sectional view on the line IX—IX, Fig. 8.

Fig. 10 is a fragmentary elevational view showing a portion of the end of a car as illustrated in Fig. 7, with means for locking the gearing in operative position preparatory to applying the braking means.

Fig. 11 is a view similar to Fig. 10, showing the mechanism in another position.

Fig. 12 is a view similar to Figs. 10 and 11, showing the mechanism in the fully released position, and Fig. 13 is a fragmentary elevational view of modified mechanism within the scope of my invention for releasing the braking means.

Fig. 14 is a fragmentary plan view of the mechanism illustrated in Fig. 13, and

Figs. 13 and 14 are fragmentary views illustrating a detail within the scope of my invention.

My invention, relating more especially to the mounting of hand-operated braking mechanism, is shown in Figs. 1 and 2 as applied to a hopper coal car of well-known type. Although so shown, my invention is not limited in its application and use to freight cars of this type.

In the drawings, and referring more particularly to Figs. 1 and 2, the end of a hopper car is indicated at A; the inwardly and downwardly sloping bottom portion at the end of the car, usually termed the slope sheet, is indicated at B; the end sill at C, and the longitudinal centre sill at D. The end walls of cars of this type are usually provided with vertically disposed supporting and reenforcing members which may be in the form of channel or angle members. In the present instance, angle members E, E' are shown at the corners of the car end, and channel members F, F' are disposed substantially at the central portion of the car end. On a deck portion G, usually provided beneath the slope sheet or inclined bottom B of the car, the brake operating air cylinders, indicated generally at H, may be placed. This cylinder controls the air-operated lever J, which may be pivotally hung at j from the underside of the slope sheet or inclined bottom portion B, while the lower portion of such lever is connected to the link and chain mechanism, indicated generally at K, and usually employed for manually operated brake mechanism.

In carrying out my invention, I provide means for mounting a brake drum at the end of the car; which drum is operatively connected to suitable gearing whereby a portion of the chain and link mechanism K may be wound thereon in applying the brake. In the present instance the brake drum is indicated at 20, and its worm gear wheel at 21; both elements being carried by a shaft 22, which may be mounted to turn in, or may be fixed to bearings 23 and 24 when the drum and worm wheel are arranged to turn on said shaft; the bearing 23 being carried by the slope sheet or inclined bottom B, while the bearing 24 may be carried by a cross-piece 25 arranged at the end of the car and supported by the channel member F and a supplementary vertical member, indicated at f. A portion of the link and chain mechanism K, leading from the bell-crank lever k may be attached directly to the surface of the drum 20, as indicated at k', so that it may be partially wound upon the drum to the desired extent when the latter is turned in either direction. When the shaft 22 is fixed in the bearings 23 and 24, the drum 20 and the worm wheel 21 will be connected together and arranged to turn on the same; otherwise, they may be keyed to the shaft 22 which may be arranged to turn in the bearings indicated.

In the arrangement illustrated in Figs. 1, 2, et seq., the worm wheel 21 is shown as engaged by a worm 30, to which movement may be imparted to drive the worm wheel in either direction and with it the drum 20. As illustrated, the worm 30 may be journaled in a yoke-shaped member 31, which may be pivotally hung from a bracket 32 supported on the underside of the slope sheet or inclined bottom B in such position that it may be swung on its pivotal support in order to effect separation of the worm from the gear or worm wheel when it is desired to relieve the braking effect. Disposed outside the side arms 31ª of the yoke member 31 in which the worm is journaled and carried by the ends of the worm, are sets of clutch teeth 33 and 34 aligned with and arranged for complemental engagement with other sets of clutch teeth carried by manually operable driving shafts whereby, when either set of teeth are in engagement, the worm may be turned.

Manually operable driving shafts, indicated at 40 and 41 and having hand wheels 40ª and 41ª, are supported in bearing brackets 42, which may be mounted on the vertical members E and E', and F and F' at the end of the car, and these shafts carry clutch teeth 43 and 44 at their ends for engagement with the clutch teeth 33 and 34 of the worm when the latter is to be turned. The respective sets of clutch teeth are normally out of engagement, as illustrated in Fig. 1, and when the brake is to be set by hand as by turning one of the shafts, 40 for instance, by its hand wheel 40ª, such shaft will be moved endwise by the operator until the clutch teeth 43 at the end of the same engage the clutch teeth 33 at one end of the worm 30 and then turned; such action turning the worm wheel 21 and winding a portion of the link and chain mechanism upon the drum 20. As will be readily understood, the relation between the worm and the worm wheel is such that self-locking of these parts is effected. When the brakes have been set manually as desired, the hand wheel 40ª is released, and a spring 45 surrounding the shaft 40 will return the same to its normal position; separating the clutch of the shaft from the clutch teeth of the worm. This action may be performed from either side of the car.

In order that the worm may be disengaged from the worm wheel when the braking action is to be relieved; their engagement providing a perfect lock, provision is made for supporting the worm-carrying yoke in such manner that it may be displaced in order to separate the worm from the worm wheel. This displacement of the worm with respect to the worm wheel is effected by a combined lateral and lifting movement when the yoke carrier 31 is swung on its pivotal support. For the purpose of swinging the yoke carrier and moving the worm away from the worm wheel, I provide a displacing element beneath the slope sheet or inclined bottom B in the nature of a cam lever, indicated at 46.

The yoke carrier 31 supporting the worm is provided on its underside with an abutment 35 and in the normal position of non-use, the cam lever is in engagement with this abutment, as clearly illustrated in Figs. 3 and 6. Connected to this cam lever is an operating rod 47, which may extend therefrom to a point adjacent the side of the car and in a position to be readily grasped by the operator when it is desired to relieve the braking effect and release the pull on the brake lever J. After this release, the rod 47 may be operated to return the yoke member 31 to its normal position; such action plus the weight of the same and the worm and a spring 49 suitably arranged in the bracket mounting will return the worm to its engagement with the worm wheel; ready for further operation as may be necessary or desirable.

The mechanism for operating the worm 30 is duplicated on opposite sides of the car. In operating the hand wheel 40ª from the right hand side of the car as indicated in Fig. 1, it will be turned in a clock-wise direction; the clutch teeth 33 and 43 being properly disposed for such operation. When operated from the opposite side of the car—the right hand side, Fig. 1—the hand wheel 41ª will also be turned in a clock-wise direction; the clutch teeth 34 and 44 being properly disposed for such operation. An operating rod 48, similar to that illustrated at 47 is provided for releasing the worm from the worm wheel; the operation in each instance being the same.

Other means for effecting the desired manually operated braking action are within the scope of my invention, as well as other means for relieving the braking action and separating the worm from the worm wheel. In Figs. 7, 8 and 9, I have shown one form of mechanism which may be employed.

As illustrated in Fig. 7, which shows the end of a coal car of the same type illustrated in Figs. 1 and 2, the worm 30 is mounted in a substantially vertically slidable bracket 50, which may be suported by a pair of uprights, indicated at $f$ and F. Instead of employing clutching means between the hand-wheel-operated shafts and the worm, the shafts 51 and 52, shown in Fig. 7, are connected to the worm shaft, indicated at $30^a$, by universal couplings 53 and 54; the outer portions of such shafts being supported in pivotal bearings 55 and 56 mounted on the uprights E and E'. The worm shaft $30^a$ is carried by suitable bearings which may be ball or roller bearings—ball bearings 57 being shown—and these bearings, in this form of my improved mechanism, are arranged for vertical movement in brackets 58 and 59 carried by the vertical members $f$ and F.

In order that the yoke bracket 50 carrying the worm 30 may be lifted to free the worm from the gear or worm wheel 21, I provide pull rods $47^a$ and $48^a$, which are similar in construction and mode of operations as the pull rods 47 and 48 shown in Figs. 1 and 2. In this form of my improved mechanism, these pull rods are connected to bell-crank levers 61 and 62, respectively, connected pivotally at $61^a$ and $62^a$ to the bearing brackets 58 and 59; the inner ends of their arms $61^b$ and $62^b$ being operatively connected at 63 to the yoke bracket 50 supporting the worm shaft $30^a$ to which the worm is splined. The lift of the bracket 50 may be against the action of springs 65 which may be mounted within the brackets 58 and 59 and overlie the worm shaft bearings 57. These springs, when used, serve to restore the worm to engagement with the gear or worm wheel 21 when the pull rods $47^a$ and $48^a$ are released; such action being assisted by the weight of the parts.

In that arrangement of my improved mechanism illustrated in Fig. 7, the connection between the drum and the brake lever is the same as that illustrated in Figs. 1 and 2.

It may be desirable to provide means for holding the worm in operative engagement with the gear or worm wheel; ready at all times for application of the brake by operation of the hand wheels $51^a$ and $52^a$ connected to the shafts 51 and 52 when the brakes are off. In Figs. 10, 11 and 12 I have shown means, more or less diagrammatically illustrated, whereby the worm 30 may be maintained in its engagement with the teeth of the gear or worm wheel 21. This mechanism will be associated with shafts and hand wheels of the type illustrated in Figs. 7, with universal couplings between the shafts 51 and 52 and the worm shaft $30^a$.

In the arrangement shown in Figs. 10, 11 and 12, I provide bell-crank levers 71 and 72, which may be pivotally hung at $71^a$ and $72^a$ to the uprights $f$ and F; such bell-crank levers being provided with pull rods $47^b$ and $48^b$ of the same character as those illustrated in the other views of the drawings. In this arrangement, the yoke bracket 50 supporting the worm shaft $30^a$ is provided with a headed pin 73 partially enclosed by a vertically movable housing 74 which is arranged to have lost motion between the top of the bracket 50 and the head $73^a$ of the pin 73.

The bearing brackets $58^a$ and $59^a$ in which the bearings 57 for the worm shaft are mounted, are arranged for movement in slide-ways 75 carried by the uprights $f$ and F, and these slideways have projections $75^a$ in fixed relation with respect to the pivotal supports for the bell-crank levers 71 and 72. The inner arms $71^b$ and $72^b$ of these bell-crank levers are operatively connected at 76 to the vertically movable housing 74 so that when either pull rod, $47^b$ or $48^b$, is operated, such housing will be lifted. As may be readily noted, the pull on either rod will be automatically communicated to the other by reason of the connection of the arms $71^b$ and $72^b$ at 76 to the movable housing 74.

In addition to the arms $71^b$ and $72^b$ carried by the bell-crank levers 71 and 72, they are provided with depending arms $71^c$ and $72^c$; the lower ends of which are in the form of hook latches as indicated at $71^d$ and $72^d$, and when the gear wheel 21 and the worm 30 are in the locked position, these hook latches engage the projections $75^a$ of the slide-ways 75, as illustrated in Fig. 10.

The head $73^a$ of the pin 73 bears such relation to the parts that initial movement of these bell-crank levers when the pull rods $47^b$ and $48^b$ are operated will withdraw the hooked ends $71^d$ and $72^d$ from their engagement with the projections $75^a$ of the slide-ways, as illustrated in Fig. 11; such action having raised the lower portion $74^a$ of the housing 74 into position just out of engagement with the head $73^a$ of the pin 73 and releasing the locking means. Upon further movement of the pull rods, the lower portion $74^a$ of the housing 74, then engaging the head $73^a$ of the pin 73, the latter will be raised and with it the bracket 50 supporting the worm shaft $30^a$ and the worm 30, and the latter will be released from its engagement with the gear or worm wheel 21, as illustrated in Fig. 12.

Upon releasing the pull rods the bell-crank levers will move or they may be moved by pushing upward on said pull rods, and the parts will be restored to the position illustrated in Fig. 10; again locking the worm in operative engagement with the gear or worm wheel 21. If necessary, this action may be supplemented by a spring arranged above the operative connection between the inner ends of the arms $71^b$ and $72^b$ of the bell-crank levers, and the vertically movable housing 74. As the parts are of material weight, the use of a spring may be unnecessary.

In the mechanism illustrated in Figs. 1 and 2, et seq., I have shown clutch teeth of angular formation. It is within the scope of my invention to employ other forms of clutching means, and in Figs. 13 and 14 I have shown the worm 30 as provided with socketed ends 95 having ribs or teeth 96, and one of the hand-wheel-operated shafts—40, for instance—provided with a toothed end 97, which may enter a socket 95. Each end of the worm will be provided with a socket, and each of the hand-wheel-operated shafts will have a toothed end for coöperative engagement therewith.

While I have shown the upright F in Fig. 1 as having an offset lower portion, it is within the scope of my invention to employ perfectly straight uprights, as illustrated in Fig. 7; the arrangement shown in Fig. 1 being intended to accommodate the parts of the mechanism in their relation to the brake cylinder of the car, which occupies a fixed position.

It will be understood of course that my improved hand-operated braking mechanism will be so mounted as to insure proper clearance at all points as required by the safety appliance rules and, at the same time, non-interference with the present position and proper operation of the air brake lever J; the mounting and arrangement of my improved braking and releasing mechanism being of a type that will permit actuation from either side of the car.

It will be further understood that the constructions herein described and shown in the accompanying drawings are for illustrative purposes only and not as limitations since many modifications may be made therein without departing from the spirit of my invention; all of which is deemed to be within the scope of the appended claims.

I claim:

1. In hand-operated braking mechanism for railway cars, the combination with the brake lever thereof, a drum mounted to rotate on a horizontal axis, a flexible connection including a bell-crank between the brake lever and the drum and a portion which may be wound upon the drum, of gearing operatively connected with said drum whereby it may be turned to wind a portion of the flexible connection thereon; said gearing including a worm mounted on a horizontal axis above another element of the gearing and in engagement therewith, means accessible from the side of the car and operatively connected to said worm for turning the same, a vertically movable support in which the worm is journaled, a guideway for said support, a bell-crank lever pivotally mounted on said guideway and operatively connected to the worm support, and independent means also accessible from the side of the car and operatively connected to said bell-crank lever for imparting upward movement to the worm support to displace the worm with respect to its coöperative element of the gearing; such displacement of the worm being in an upward direction.

2. In hand-operated braking mechanism for railway cars, the combination with the brake lever thereof, a drum mounted to rotate on a horizontal axis, a flexible connection between the brake lever and the drum including a bell-crank lever and a portion which may be wound upon the drum, of gearing operatively connected with said drum whereby a portion of the flexible connection may be wound thereon; said gearing including a worm mounted on a horizontal axis, a shaft accessible from the side of the car and operatively connected to said worm for turning the same, a vertically movable support in which the worm is journaled, a guideway for said support, a bell-crank lever movably mounted on said guideway and pivotally connected to the worm support, and a pull rod connected to the bell-crank lever and accessible from the side of the car for imparting upward movement to the worm support to displace the worm with respect to its coöperative gearing element; such displacement of the worm being in an upward direction.

3. In hand-operated braking mechanism for railway cars, the combination with the brake lever, a drum mounted to rotate on a horizontal axis and a flexible connection between the brake lever and the drum having a portion which may be wound upon the latter, of gearing for turning said drum including a worm and worm wheel in coöperative relation; the drum being operatively associated with the worm wheel, means for imparting movement to the worm to turn the drum, a vertically movable support in which said worm is journaled, fixed guideways in which said worm support may be moved, latches for normally holding the worm support in a fixed position in said guideways, and means for imparting upward movement to the worm support and simultaneously releasing the latches whereby the worm may be displaced with respect to the worm wheel.

4. In hand-operated braking mechanism, the combination with a brake lever, a drum mounted to rotate on a horizontal axis and a connection between the same and the brake lever including a portion which may be wound upon the drum, of means for rotating the drum including a plurality of gearing elements in coöperative relation, means for operating said gearing elements, releasable holding means for preventing separation of said elements in their engaged position, and means for releasing said holding means and simultaneously effecting separation of the gearing elements.

5. In hand-operated braking mechanism, the combination with a brake lever, a drum mounted to rotate on a horizontal axis and a connection between the same and the brake lever including a portion which may be wound upon the drum, of means for rotating the drum comprising a plurality of gearing elements in coöperative relation including a gear wheel and a worm for engagement therewith, means for operating the worm, a support for the worm a bell-crank lever operatively connected with said worm support, holding means associated with said bell-crank lever for preventing separation of the worm from its operative relation with the gear wheel, and means for effecting movement of said bell-crank lever to release said holding means and simultaneously displace the worm from its operative engagement with the gear wheel.

6. In hand-operated braking means for railway cars, the combination with a brake lever, a drum mounted to rotate on a horizontal axis and a connection between the drum and brake lever including a portion to be wound upon the drum, means for rotating the drum comprising a plurality of gearing elements in coöperative relation including a worm wheel and a worm in engagement therewith, a shaft disposed in axial alignment with the worm, a universal coupling connecting the worm with the inner end of said shaft; the latter having a hand wheel operable from the side of the car for rotating the worm, a vertically movable support for the worm, a fixed guideway for said support, a bell-crank lever pivotally mounted on said guideway and operatively connected with said worm support; said bell-crank lever having a holding latch and the fixed guideway having a portion engaged thereby, for preventing separation of the worm from its operative engagement with the worm wheel, and independent means connected to the bell-crank lever and operable from the side of the car for effecting movement of the latter to release said holding latch and simultaneously lift the worm support to displace the worm from the worm wheel.

7. In hand-operated braking mechanism for railway cars, the combination with a brake lever, a drum mounted to rotate on a horizontal axis and a connection between the brake lever and drum including a portion which may be wound upon the drum, of means for rotating said drum comprising a plurality of gearing elements in coöperative relation including a worm wheel carried by the drum and a worm horizontally mounted above the worm wheel for imparting movement thereto; said worm being displaceable with respect to the worm wheel, a shaft disposed in axial alignment with the worm, a universal coupling connecting the worm with the inner end of said shaft; the latter having a hand wheel operable from the side of the car for turning said worm, a vertically movable support for the worm, a fixed guideway for said support, a bell-crank lever operatively connected to said worm support and pivotally mounted on said fixed guideway, means in the form of a hook latch associated with the bell-crank lever for preventing separation of the worm from the worm wheel, and independent means operable from the side of the car and connected to the bell-crank lever for moving the latter whereby the means preventing separation of worm and worm wheel may be released and the worm simultaneously displaced with respect to the worm wheel.

8. In hand-operated braking mechanism for railway cars, the combination with a brake lever, a drum mounted to rotate on a horizontal axis and a connection between the brake lever and drum including a portion which may be wound upon the drum, of means for rotating said drum comprising a plurality of gearing elements in coöperative relation including a worm wheel carried by the drum and a worm horizontally mounted above the worm wheel for imparting movement thereto; said worm being displaceable with respect to the worm wheel, a vertically movable support in which said worm is journalled, a shaft operable from the side of the car for turning said worm, a movable support for the worm, a universal coupling connecting the inner of the shaft with the worm, a pivoted bearing for the outer end of the shaft, a bell-crank lever operatively connected to said worm support, a fixed support for the bell-crank lever in which it is pivotally mounted, latching means associated with the bell-crank lever for preventing separation of the worm from the worm wheel, and a pull rod operable from the side of the car and connected to the bell-crank lever for moving the latter whereby the latching means preventing separation of worm and worm wheel may be released and the worm simultaneously displaced with respect to the worm wheel.

9. In hand-operated braking mechanism for railway cars, the combination with a brake lever, a drum mounted to rotate on a horizontal axis, a connection between the brake lever and the drum including a portion which may be wound upon the latter, of a toothed element carried at the end of the drum, a worm mounted to turn on a horizontal axis above the toothed element and arranged for engagement therewith whereby movement may be imparted to the toothed element when the worm is turned, a shaft disposed substantially in a horizontal position operatively connected to the worm and having turning means accessible from the side of the car, a vertically movable frame in which the worm is journaled, a bell-crank lever connected to said frame, and a pull rod operable from the side of the car and connected to said bell-crank lever for moving the latter to bodily lift the worm out of engagement with the toothed element.

10. In hand-operated braking mechanism for railway cars, the combination with a brake lever, a drum mounted to turn on a horizontal axis and a connection between the brake lever and drum including a portion which may be wound on the latter, of a toothed element fixed to the end of the drum, a worm mounted on a horizontal axis at right angles to the axis of the toothed element and in engagement therewith whereby movement may be imparted thereto, a shaft operatively connected to the end of the worm for imparting rotative movement thereto actuated from the side of the car, a vertically movable support in which the worm is journaled, fixed guideways in which said support may be moved, a pull rod accessible from the side of the car, and means operatively connecting said pull rod with the worm support whereby the latter may be raised to disengage the worm from the toothed element by the operation of said pull rod.

11. A structure as set forth in claim 10 wherein the shaft for turning the worm is connected thereto by a universal coupling.

12. A structure as set forth in claim 11, wherein the shaft is connected to the worm by a universal coupling and is capable of angular movement, and a pivotal bearing for supporting the outer end of said shaft.

13. In hand-operated braking mechanism for railway cars, the combination with a brake lever, a drum mounted to rotate on a horizontal axis and a connection between the brake lever and drum including a portion which may be wound upon the drum, of a toothed element carried at one end of the drum, a worm mounted above the toothed element on a horizontal axis and in operative engagement therewith, means including a shaft and an operating hand wheel therefor accessible from the side of the car for turning the worm to wind a portion of the brake lever connection on the drum, a universal coupling connecting the end of the operating shaft and the end of the worm, a vertically movable support in which the worm is journaled operable to lift said worm out of engagement with the toothed element, a fixed guideway for said support, a bell-crank lever pivotally mounted on said guideway, and a pull rod connected to said bell-crank lever and operable from the side of the car; operation of said pull rod effecting upward movement of the worm support through the medium of said bell-crank lever whereby the worm may be lifted out of its operative engagement with the toothed element.

GORDON W. TABOR.

REFERENCES CITED

The following references are of record in the file of this patent:

UNITED STATES PATENTS

| Number | Name | Date |
| --- | --- | --- |
| 987,534 | Barr | Mar. 21, 1911 |
| 995,164 | Lindstrom | June 13, 1911 |
| 1,553,351 | Wood | Sept. 15, 1925 |
| 1,562,967 | Johnson et al. | Nov. 24, 1925 |
| 1,581,097 | Brown | Apr. 20, 1926 |
| 1,582,546 | Russell | Apr. 27, 1926 |
| 1,707,362 | O'Connor | Apr. 2, 1929 |